UNITED STATES PATENT OFFICE.

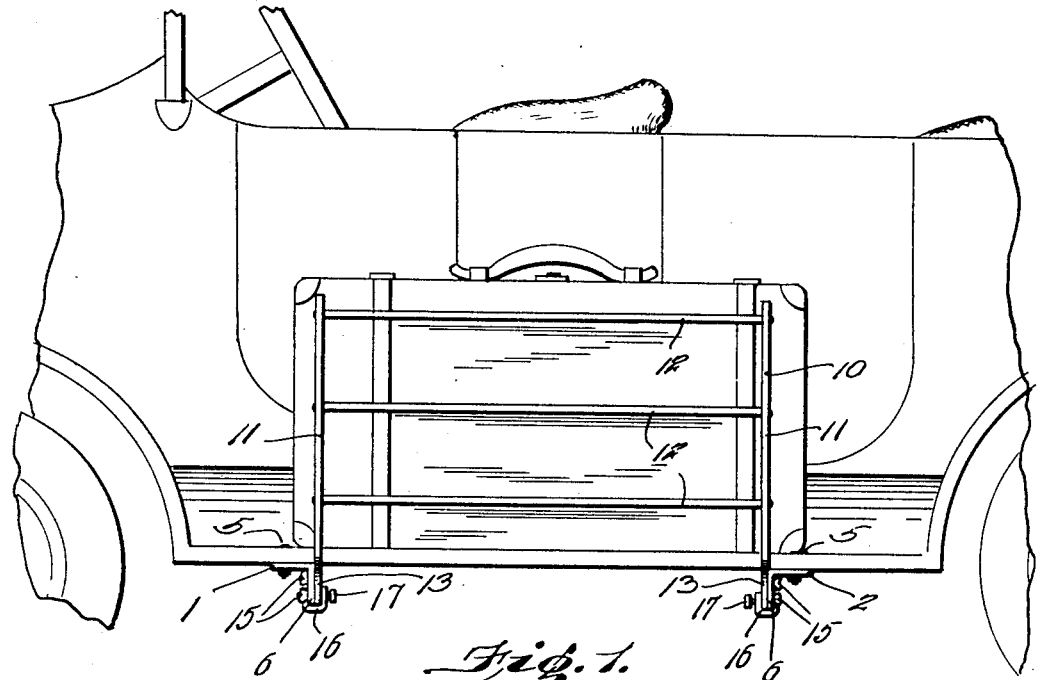
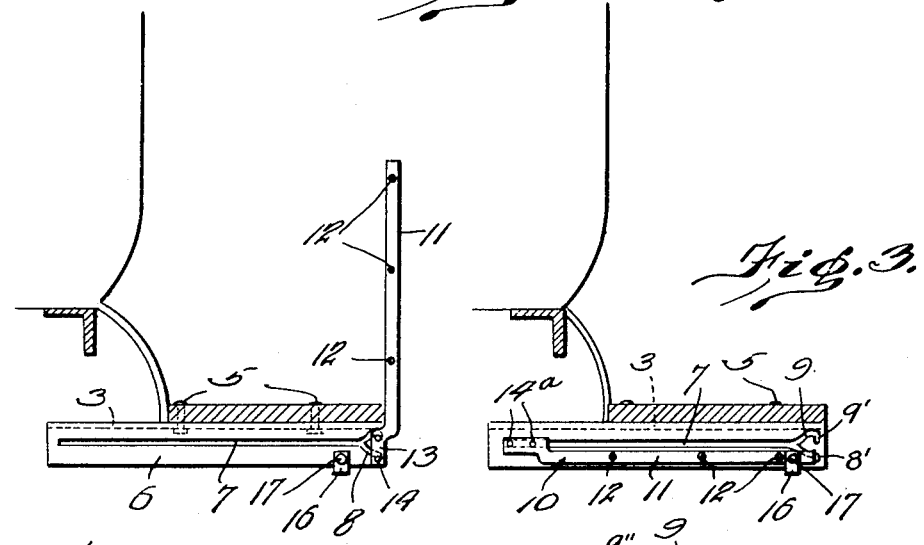
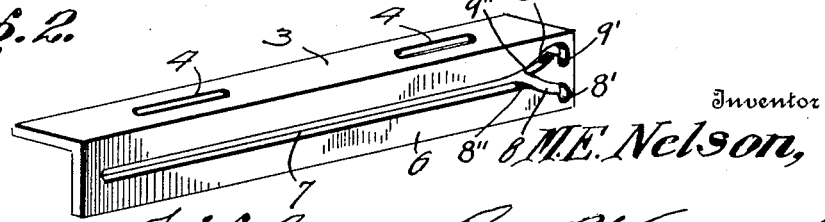

MORTON E. NELSON, OF ALBERT LEA, MINNESOTA.

LUGGAGE-CARRIER.

1,398,140.   Specification of Letters Patent.   Patented Nov. 22, 1921.

Application filed September 9, 1920. Serial No. 409,167.

*To all whom it may concern:*

Be it known that I, MORTON E. NELSON, a citizen of the United States, residing at Albert Lea, in the county of Freeborn and State of Minnesota, have invented certain new and useful Improvements in a Luggage-Carrier, of which the following is a specification.

This invention relates to luggage carriers applicable to running boards of vehicles, more especially to automobile running boards.

The object of the invention is to provide a skeleton frame or rack which when not in use may be folded down under the running board and secured and when desired for use may be drawn out and raising into partially upright position and by a slight upward movement thereof by the operator positioned vertically and locked in such position.

Another object is to provide a device of this character which is cheap to manufacture, may be quickly set up for use and collapsed when not desired for use.

With these and other objects in view, the invention consists in certain novel features of construction as hereinafter shown and described and then specifically pointed out in the claims, and in the drawings illustrative of the preferred embodiment of the invention.

In the accompanying drawing:

Figure 1 represents a side elevation of a portion of an automobile with the carrier constituting the invention shown applied and in operative position.

Fig. 2 is a transverse vertical section thereof, with the carrier in operative position, Fig. 3 is a similar view with the carrier shown in inoperative position, and Fig. 4 is a detail perspective view of one of the angle irons.

In the embodiment illustrated, a carrier constituting this invention is shown mounted on a running board B of an automobile and comprises two attaching members in the form of angle irons 1 and 2 L-shaped in cross section with one flange 3 thereof slotted longitudinally as shown at 4, for the adjustable connection of said members to the underface of the running board of the car, it being understood that securing bolts 5 are passed through these slots and the running board.

The other flanges 6 of the members 1 and 2 depend from the lower face of the running board, the members being arranged transversely of the running board, and said flanges are each provided with a longitudinal slot 7 extending throughout the greater portion of the flange and branching at its outer end into inclined oppositely curved diverging guiding slots 8 and 9 having down-turned outer ends 8' and 9' for a purpose to be described. The inner ends of the outer walls of slots 8 and 9 where they merge into slot 7 are oppositely curved as shown at 8" and 9" for directing the advancing bolts 14 and 14ᵃ into the diverging slots 8 and 9.

A rack member 10 is hingedly and slidably mounted on the members 1 and 2 by means of the bolts 14 and 14ᵃ, two of which are carried by the lower end of each upright 11, said lower ends being offset inwardly, as shown at 13. These bolts 14 and 14ᵃ are longitudinally alined to adapt them to slide in the slots 7 of the members 1 and 2 and are positioned to engage the upper walls of said slots 7. The bolts 14 and 14ᵃ are equipped with wing nuts 15 which when tightened up hold the rack in upright operative position.

The rack 10 is composed of two or more of the uprights 11 connected by spaced cross bars 12, any desired number of which may be employed, three being here shown. To hold the rack 10 in collapsed inoperative position and prevent rattling thereof, U-shaped clips 16 are carried by the flanges 6 of the members 1 and 2 and are equipped with set screws 17, which when tightened up secure the rack to the members 1 and 2 and hold it against rattling.

In the use of this carrier, the parts being in operative position as shown in Fig. 1, the wing nuts 15 are first loosened, and the rack 10 swung downwardly and then moved inwardly under the running board, the bolts 14 operating in the slots 7 which form guides for the rack. After the rack is slid under the running board, the screws 17 are tightened to hold them securely to the members 1 and 2 to prevent rattling thereof and the screws 15 may also be tightened to assist in such holding.

When it is desired to raise the rack for use the set screws 15 and 17 are first loosened and the rack is manually drawn outward, the bolts 14 and 14ᵃ entering the slots 8 and 9, the front one riding up said slot 9 and the rear one being thereby directed into slot 8 causing the rack to rise to a predetermined point when a slight upward pressure thereon will cause it to swing into upright position and the bolts 14 and 14ᵃ to drop into the vertical slot ends 8' and 9' and lock the rack in operative position. The curve 9'' at the junction of slots 7 and 9 operates to direct the front bolt 14 into slot 9.

The slots 4 in the flange 3 of the members 1 and 2 provide for the adjustment of these members on the running board.

From the above description it will be obvious that a carrier constructed as shown and described herein may be easily set up for use by simply pulling out the rack 10 which owing to the peculiar arrangement of the slots 8 and 9 and the engagement of the bolts 14 and 14ᵃ therewith causes the rack to move upward into partially raised position requiring only a slight upward push to cause it to assume an upright position and which when it reaches such position will automatically drop into the vertical slots 9' and 8' and be held locked in upright position. To lower the rack it is first raised to release bolts 14 from the vertical slots 9' and 8' and is then swung outwardly and then slipped inwardly where it will be positioned out of sight under the running board and out of the way.

The preferred embodiment of the invention is disclosed in the drawings and set forth in the specification, but it will be understood that any modifications within the scope of the claims may be made in the construction without departing from the principle of the invention or sacrificing any of its advantages.

I claim:

1. A luggage carrier for automobile running boards comprising two members, one of which is adapted to be attached to the running board and the other hingedly and slidably connected with the running board carried member, and coöperating means carried by said members to cause the partial raising of the hinged member when an outward pull is exerted thereon, a slight upward push by the operator causing said member to rise into complete vertical position, and means for locking it in such position.

2. A luggage carrier for automobile running boards comprising two members, one of which is adapted to be attached to the running board transversely thereof, and to form a guide for the other, the other member being in the form of a rack hingedly and slidably connected with the guide, and coöperating means carried by said members to cause the partial raising of the rack when drawn outward, the raising movement of the rack being completed by a slight upward force exerted thereon by the operator, and means to hold said rack in raised position.

3. A carrier of the class described comprising a plurality of angle irons for connection with the lower face of an automobile running board transversely thereof, one flange of each iron depending from the running board and slotted longitudinally with diverging bayonet slots at its outer end, a rack including uprights having inwardly offset portions equipped with bolts to slide in said slots whereby the rack will be raised when drawn out and held in raised position.

4. A carrier of the class described comprising a plurality of angle irons L-shaped in cross section and adapted to be secured to the lower face of an automobile running board transversely thereof with one of the flanges depending, said depending flanges being longitudinally slotted and provided at their outer ends with diverging branches, a rack including uprights having inwardly offset lower ends with bolts extending therethrough and adapted to enter the slots in said irons, the bolts in said offset portions being longitudinally alined to enter the branches of said slots and thereby raise the racks when drawn out and hold them in raised position.

In testimony whereof I affix my signature hereto.

MORTON E. NELSON.